US012575662B2

(12) United States Patent
Kavanagh et al.

(10) Patent No.: US 12,575,662 B2
(45) Date of Patent: Mar. 17, 2026

(54) TOOTHBRUSH WITH REPLACEABLE BRUSH HEAD

(71) Applicant: ORKLA HEALTH AS, Oslo (NO)

(72) Inventors: Christopher John Kavanagh, Oslo (NO); Christian Abry, Eiksmarka (NO)

(73) Assignee: ORKLA HEALTH AS, Oslo (NO)

( * ) Notice: Subject to any disclaimer, the term of this patent is extended or adjusted under 35 U.S.C. 154(b) by 273 days.

(21) Appl. No.: 18/555,616

(22) PCT Filed: Mar. 29, 2022

(86) PCT No.: PCT/EP2022/058304
§ 371 (c)(1),
(2) Date: Oct. 16, 2023

(87) PCT Pub. No.: WO2022/218697
PCT Pub. Date: Oct. 20, 2022

(65) Prior Publication Data
US 2024/0197063 A1 Jun. 20, 2024

(30) Foreign Application Priority Data

Apr. 16, 2021 (EP) ..................................... 21168873

(51) Int. Cl.
*A46B 5/00* (2006.01)
*F16B 7/22* (2006.01)
(52) U.S. Cl.
CPC .............. *A46B 5/0095* (2013.01); *F16B 7/22* (2013.01); *A46B 2200/1066* (2013.01)

(58) Field of Classification Search
CPC .......... A46B 2200/1066; A46B 5/0095; A46B 7/044; A46B 7/04; A46B 7/042
See application file for complete search history.

(56) References Cited

U.S. PATENT DOCUMENTS

| | | | |
|---|---|---|---|
| 4,780,924 A | 11/1988 | Hansen et al. | |
| 5,224,234 A * | 7/1993 | Arsenault | A46B 5/0033 |
| | | | 15/176.1 |
| 5,511,276 A * | 4/1996 | Lee | A46B 5/02 |
| | | | 15/176.1 |
| 6,237,183 B1 * | 5/2001 | Fischer | A46B 7/04 |
| | | | 15/176.1 |
| 6,546,585 B1 | 4/2003 | Blaustein et al. | |
| 2019/0246780 A1 | 8/2019 | Jungnickel et al. | |

FOREIGN PATENT DOCUMENTS

| | | | |
|---|---|---|---|
| KR | 2019940004928 U | 3/1994 | |

* cited by examiner

*Primary Examiner* — Shay Karls
(74) *Attorney, Agent, or Firm* — Seed Intellectual Property Law Group LLP

(57) ABSTRACT

Disclosed is a toothbrush with a replaceable head having a simple design which is not prone to damage and/or breakage. The disclosed toothbrush achieves a high level of hygiene and cleaning, and avoids small details and/or sharp edges which are difficult to clean and more vulnerable to catching toothpaste remains and dirt.

20 Claims, 6 Drawing Sheets

*12*

*11*

*14*    *13a*    *13b*

*12*

*11*    *13a*    *13b*    X

TOOTHBRUSH WITH REPLACEABLE BRUSH HEAD

TECHNICAL FIELD OF THE INVENTION

The field of the present invention concerns a toothbrush with a replaceable brush head.

BACKGROUND OF THE INVENTION

It is known in the art to produce toothbrushes with a replaceable brush head that can be detached from the handle to be removed and replaced by a new brush head. This allows to save the material of the handle when the brush head needs to be replaced to ensure a desired functionality of the toothbrush, thus reducing the environmental impact of the product.

According to a known technique, the attachment of the handle to the brush head has been achieved by means of a snap locking mechanism; the snap locking mechanism includes two protuberances configured to snap into an engagement position in corresponding respective two recesses; the protuberances extend in a horizontal plane substantially perpendicular to the bristles of the brush. These known toothbrushes were not satisfactory, because they involved a complex design including a plurality of flexible components of small dimensions that could be prone to damage and/or breakage. Furthermore, they were not good for hygiene/bacterial growth. Small details tend to catch toothpaste and bacteria, and are difficult to clean. Build-up of toothpaste remains could also possibly affect locking function over time. Furthermore, due to the limited available dimension corresponding to the breadth of the brush head, the snap engagement interference of the protuberances in the respective recesses was relatively small, thus enabling only a limited resistance to accidental detachment of the brush head during the usage of the toothbrush.

According to another known technique, the handle includes a longitudinal finger configured to engage into a dove-tailed groove formed in the brush head to attach the brush head to the handle. In this known art, the finger is substantially rigid and is engaged into the dove-tailed groove along its whole longitudinal extension. Accordingly, a snap locking engagement is made possible only by a deformation of the brush head. In this conventional technique, the quality of the toothbrush is relatively low because the material of the brush head does not have an adequate rigidity, so that breakage or detachment of the brush head during the use of the toothbrush are possible. Furthermore, the deformability of the brush head's material may lead to a poorly effective cleaning performance of the toothbrush.

Hence, the toothbrushes with a replaceable head of the known art were not satisfactory at least because they had a complex design, they were prone to damages and/or breakage and they employed a brush head with materials of low rigidity, thus leading to a reduced quality of the toothbrush and of its cleaning performance.

SUMMARY OF THE INVENTION

In view of the above problems, it is an object of the present invention to provide a toothbrush with a replaceable head having a simple design which is not prone to damage and/or breakage. A further object of the invention is to achieve a high level of hygiene/cleaning, and to avoid small details and/or sharp edges which would be difficult to clean and more vulnerable of catching toothpaste remains and dirt;

especially, in regard of the handle which is the primary part that could be more exposed to build-up of toothpaste remains. Hence, an object of the invention is to secure function over time and reduce bacterial growth. A further object of the invention is to provide a toothbrush with a replaceable brush head having a satisfactory rigidity of the components in assembled state. A further object of the invention is to provide toothbrush with a replaceable head allowing to achieve a desired cleaning performance. A further object of the invention is to provide a toothbrush with a replaceable head in which the risk of accidental detachment of the brush head during use of the toothbrush is limited.

In view of the above objects, the present invention proposes a toothbrush including a handle forming a gripping portion of the toothbrush and a replaceable brush head carrying a plurality of bristles, wherein the replaceable head is connectable to the handle in a detachable manner by means of a snap locking mechanism, the snap locking mechanism including a finger protruding from the handle and a recess formed in the brush head, wherein the finger extends along a longitudinal direction;

characterized in that the finger includes a flexible portion and a non-flexible portion that are configured to be at least partly received in the recess when the brush head is mounted on the handle;

wherein the non-flexible portion connects the flexible portion to the handle;

wherein the flexible portion is configured to elastically flex away from the bristles with respect to the non-flexible portion in a direction transversal to the longitudinal direction during the insertion of the finger into the recess along the longitudinal direction, wherein the flexible finger portion is configured to flex due to the interaction with an inclined surface formed in the recess during insertion of the finger into the recess along the longitudinal direction, wherein the flexible portion includes a protrusion configured to snap into an engagement position with the recess when the protrusion slides beyond the inclined surface inside the recess.

According to the invention, the finger protruding from the handle of the toothbrush includes a flexible portion (or segment) and a non-flexible portion (or segment) received in use in the recess formed in the brush head. Since the flexible portion of the finger can flex in a direction transversal to the longitudinal extension of the finger away from the bristle, a sufficiently strong snap engagement can be achieved with an adequate locking interference in a simple construction. This ensure a proper reliable function of the toothbrush with a low risk of accidental detachment during use. Furthermore, the design of the handle and, in particular, of the snap locking mechanism is rather simple and include only one movable component; this allows reducing the risk of breakage and enhance reliability of the toothbrush operation. Furthermore, thanks to the arrangement according to the invention, the brush head can be realized with a desired high rigidity, thereby ensuring high quality of the brush components and a satisfactory cleaning performance.

According to an embodiment, the recess is open on a back side of the replaceable head opposite to the bristles. This allows to achieve a sufficiently high snap locking interference by enabling a sufficient flection of the flexible portion of the finger away from the bristles during insertion of the finger into the recess in the brush head. Furthermore, the design of the brush head is simplified and the consumption of material in the disposable element is reduced.

According to an embodiment, when the brush head is mounted on the handle, the surface in the recess is inclined with respect to the longitudinal direction of an angle in the range 5°-65°, preferably in the range 20°-40°, most preferably in the range 25°-35°. This allows to easily achieve the flection of the finger during the attachment of the handle to the brush head.

According to an embodiment, when the protrusion is in the engagement position with the recess, an interference height of the protrusion and an element of the recess forming the inclined surface is in the range 0.5 mm-2.5 mm when measured in a direction perpendicular to the longitudinal direction, preferably in the range 0.5 mm-1.2 mm, most preferably in the range 0.5 mm-0.8 mm. This allows to achieve a sufficiently strong attachment of the handle to the brush head, thereby reducing the risk of accidental detachment in use. At the same time, the force needed to detach the brush head from the handle is sufficiently low to ensure a comfortable and intuitive replacement by the user.

According to an embodiment, the protrusion has a height in the range 20%-70% of the thickness of the non-flexible portion measured in a direction from a back side of the brush head to a front side of the brush head carrying the bristles, or the protrusion has a height in the range 0.5 mm-2.5 mm, preferably in the range 0.75 mm-1.25 mm. This allows to achieve a sufficiently strong attachment of the handle to the brush head.

According to an embodiment, the protrusion includes a snap engagement surface facing the non-flexible portion and being inclined of an angle in the range 100°-135° with respect to the longitudinal direction, preferably in the range 110°-125°, the snap engagement surface being configured to lock the finger into the recess. This contributes to achieve a sufficiently strong attachment of the handle to the brush head, thereby reducing the risk of accidental detachment in use.

According to an embodiment, the non-flexible portion has a T-shaped cross section. This contributes to achieve a desired rigidity of the non-flexible portion of the finger, thereby ensuring a desired mutual positioning of brush head and handle.

According to an embodiment, the non-flexible portion includes two lateral ribs on opposite sides of the finger configured to slide and engage into corresponding grooves formed in the recess during the elastic flexing of the flexible portion. This contributes to maintaining the handle in a desired position with respect to the brush head both in use and during the insertion of the finger in the brush head's recess, thereby allowing a desired flection of the flexible portion of the finger during the snap attachment.

According to an embodiment, the length of the non-flexible portion in the longitudinal direction is in the range 50%-80% of the whole length of the finger received in the recess, preferably in the range 65%-75% of the whole length of the finger received in the recess. This allows to achieve a desired mutual positioning of the handle with respect to the brush head both in use and during the insertion of the finger in the brush head's recess; furthermore, this feature ensures an opportune length of the flexible portion of the finger, thereby contributing to enable an opportune flection of the flexible portion of the finger according to an optimal snap engagement interference height.

According to an embodiment, with respect to a direction substantially parallel to the bristles, the thickness of the non-flexible portion is in the range 55%-85% of the thickness of a segment of the handle adjacent to the non-flexible portion, preferably in the range 55%-65% of the thickness of a segment of the handle adjacent to the non-flexible portion. This allows to achieve material savings in the toothbrush due to the reduced thickness of the finger portion, while ensuring a proper rigidity of the article in the assembled state.

According to an embodiment, the grooves are formed adjacent to a bottom surface of the recess. Further, according to an embodiment, the ribs are formed on an upper side of the finger opposite to a lower side of finger forming the back surface of the toothbrush when the brush head is mounted on the handle, wherein the ribs form a planar surface together with the upper side of the finger. This allows to achieve a desired rigidity of the brush head by forming the grooves as far as possible from the back side of the brush head, while the size of the brush head in the direction of the bristles can be reduced.

According to an embodiment, the ribs have a thickness which is in the range 20%-65% of a thickness of the non-flexible portion measured in a direction substantially parallel to the bristles when the head is mounted on the handle, preferably in the range 30%-40% of the thickness of the non-flexible portion. This achieves a desired rigidity of the components while minimizing material consumption.

According to an embodiment, the flexible portion forms a concavity between the non-flexible portion and the protrusion on an upper side of the finger facing the brush head when the brush head is mounted on the handle, wherein the part of the flexible portion forming the concavity has a thickness in the range 40%-80% of the thickness of the non-flexible portion in a direction substantially parallel to the bristles, preferably in the range 60%-80% of the thickness of the non-flexible portion. This allows to achieve a sufficient flexibility of the flexible portion to achieve the snap engaging movement with the desired snap engagement interference under the forces that can be comfortably exerted by a user.

According to an embodiment, the longitudinal direction of the finger is substantially parallel to a longitudinal direction of a gripping portion of the handle, preferably the longitudinal direction of the finger being inclined less than 20° with respect to a longitudinal direction of a gripping portion of the handle.

BRIEF DESCRIPTION OF THE DRAWINGS

The above and other advantages of the present invention will be illustrated with reference to example embodiments of the invention, described with reference to the appended drawings listed as follows.

DETAILED DESCRIPTION OF THE PREFERRED EMBODIMENTS

Figure 1:
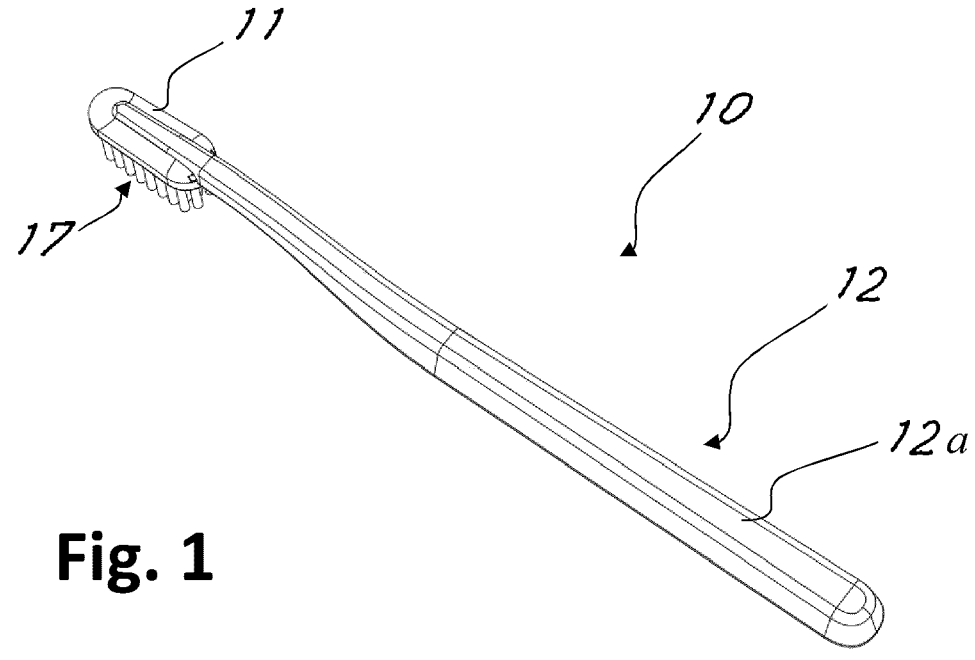
FIG. 1 shows a view of the toothbrush according to an embodiment of the present invention in assembled state.

FIG. 1 shows a toothbrush 10 according to an embodiment of the invention in assembled state. The toothbrush 10 includes a handle 12 forming a gripping portion 12a of the toothbrush and a replaceable brush head 11 carrying a plurality of bristles 17. Both the handle 12 and the brush head 11 can be manufactured in any suitable known material, such as molded plastic. For example, PP could be used as material, although other plastic materials may be used.

Figure 2:
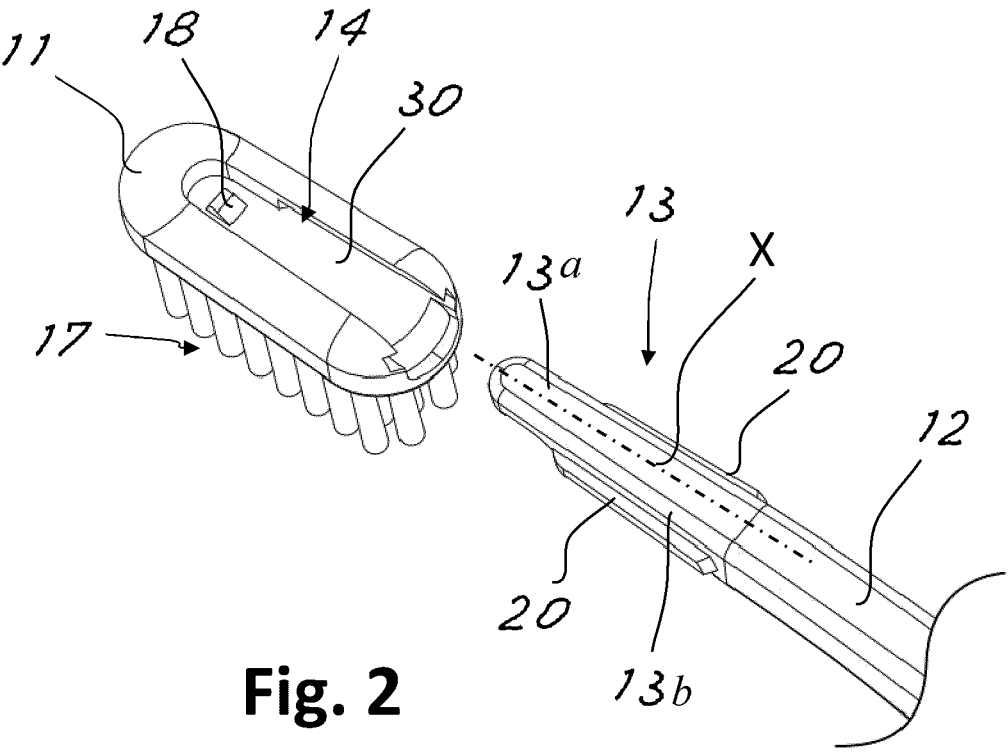
FIG. 2 shows the brush head and the handle of the toothbrush in a detached state.
Figure 3:
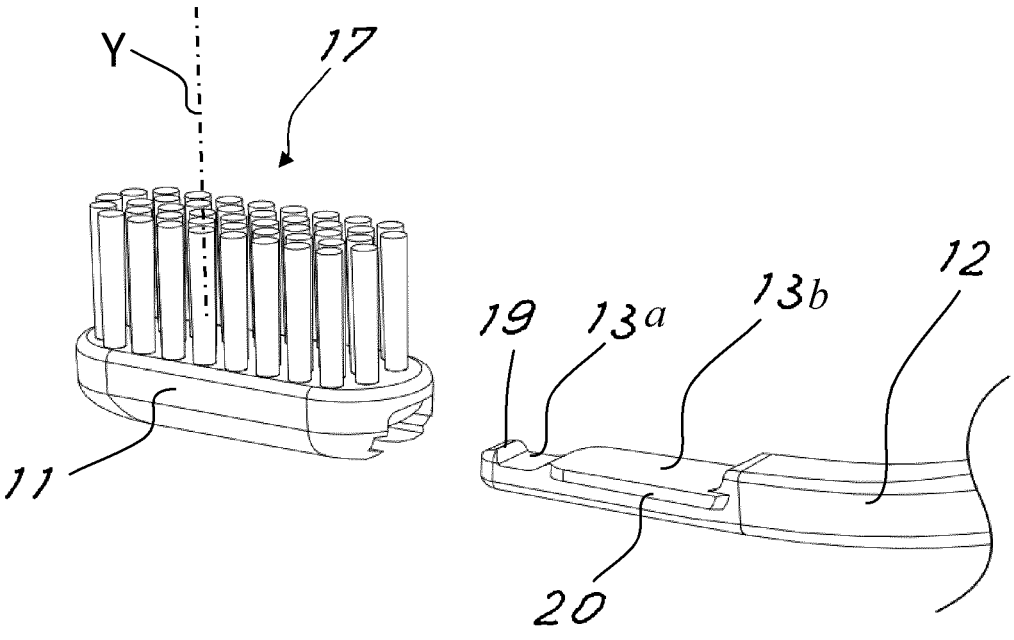
FIG. 3 shows another view of the brush head and the handle of the toothbrush in a detached state.

As shown in FIGS. 2-7, the replaceable head 11 is connectable to the handle 12 in a detachable manner by means of a snap locking mechanism 13, 14. The snap locking mechanism includes a finger 13 protruding from the handle 12 and a recess 14 formed in the brush head 11. Advantageously, the finger 13 is formed in one piece integral with the handle 12. The finger 13 extends along a longitudinal direction X as shown in FIG. 2. Preferably, the longitudinal direction X of the finger is substantially parallel to a longitudinal direction of the gripping portion 12a of the handle, e.g. the longitudinal direction X of the finger may be inclined less than 20° with respect to a longitudinal direction of the gripping portion 12a of the handle.

The finger 13 includes a flexible portion 13a and a non-flexible portion 13b that are configured to be at least partly received in the recess 14 when the brush head 11 is mounted on the handle 12; in other words, both the flexible portion 13a and the non-flexible portion 13b are received in the recess in assembled state. Preferably, both the flexible portion 13a and the non-flexible portion 13b are received in the recess in assembled state along their whole respective length in the longitudinal direction X; as well illustrated at FIG. 7, only an outer part of the flexible portion 13a and of the non-flexible portion 13b opposite to the brush head 11 is not inside the recess 14 in assembled state.

As shown in FIG. 2, the flexible portion 13a and the non-flexible portion 13b forms subsequent adjacent segments of the finger along the longitudinal direction X. The flexible portion 13a and the non-flexible portion 13b are formed integral to each other, preferably of the same molded plastic material as the handle 12. The material used to manufacture the finger 13, such as molded plastic, is chosen to ensure a sufficient degree of flexibility of the non-flexible portion to enable the snap engagement as described later. The non-flexible portion 13b connects the flexible portion 13a to the handle 12.

Figure 6:
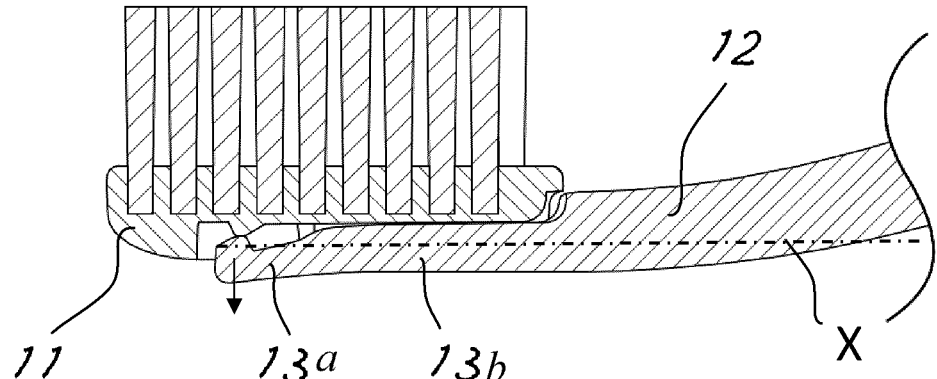

As well shown in FIG. 6, the flexible portion 13a is configured to elastically flex away from the bristles 17 with respect to the non-flexible portion 13b in a direction transversal to the longitudinal direction X during the insertion of the finger 13 into the recess 14 along the longitudinal direction X.

Figure 4:
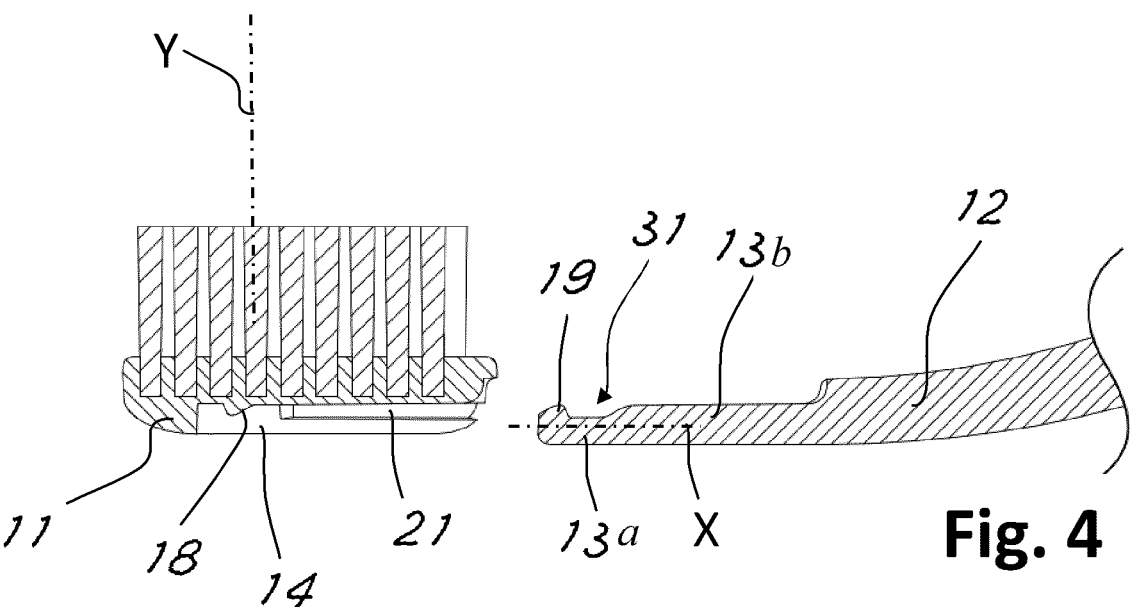
FIGS. 4-7 show cross sections of the brush head and the handle in different subsequent phases of the attachment process.
Figure 5:
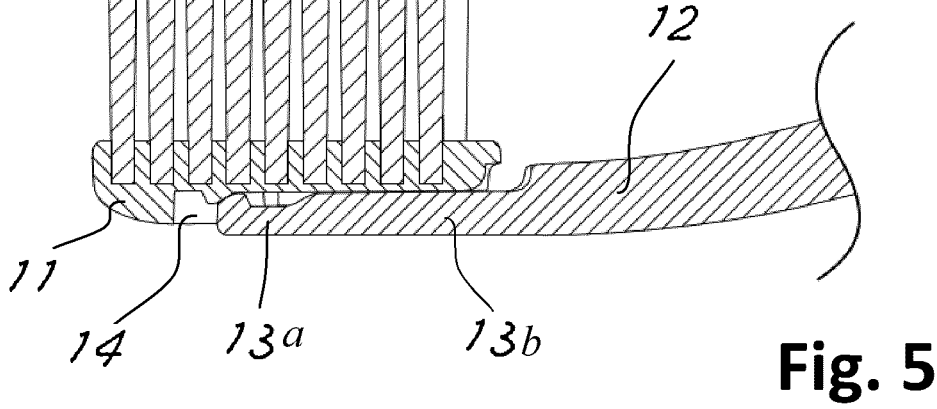

The flexible finger portion 13a is configured to flex due to the interaction with an inclined surface 18 formed in the recess 14 during insertion of the finger 13 into the recess 14 along the longitudinal direction X (see FIGS. 4-6). The flexible portion 13a includes a protrusion 19 configured to snap into an engagement position with the recess 14 when the protrusion 19 slides beyond the inclined surface 18 inside the recess 14 (see FIG. 7). Specifically, the protrusion 19 engages with the element 32 forming the inclined surface 18 inside the recess 14. Advantageously, the protrusion 19 is formed at the end of the finger 13, far from the handle 12.

Figure 7:
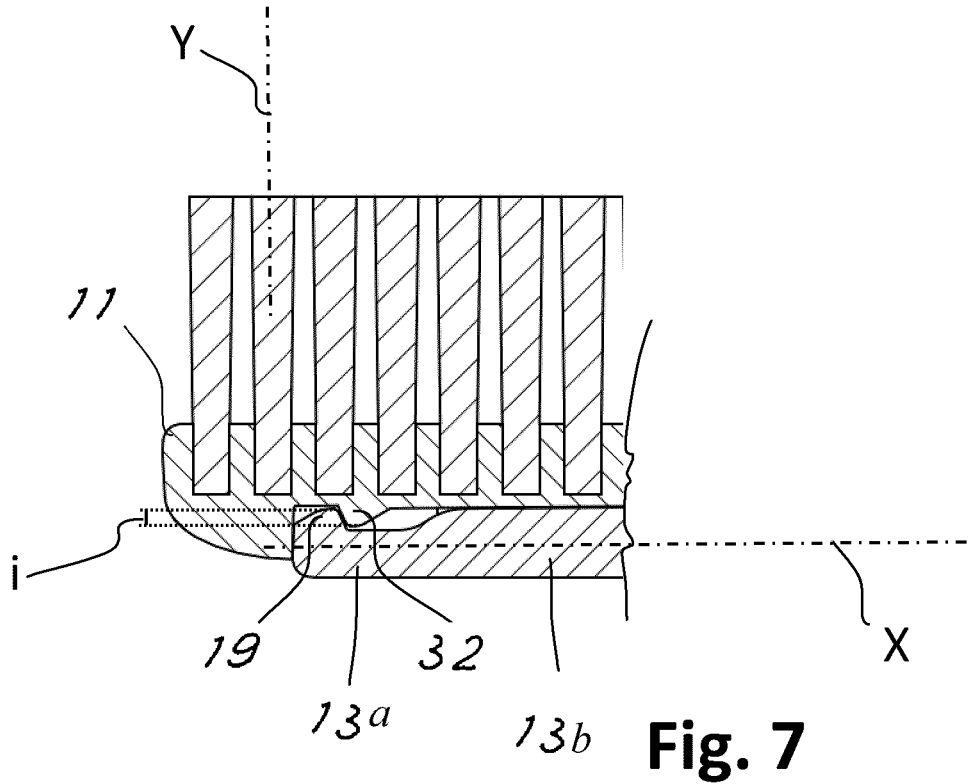

As shown at FIG. 7, when the protrusion 19 is in the engagement position with the recess 14, an interference height i of the protrusion 19 and the inclined surface 18 is in the range 0.5 mm-2.5 mm when measured in the direction Y perpendicular to the longitudinal direction X, preferably in the range 0.5 mm-1.2 mm, most preferably 0.5 mm-0.8 mm. In the present disclosure, the direction Y is a direction substantially perpendicular to the longitudinal direction X of the finger that leads from a back side of the brush head to a front side of the brush head carrying the bristles 17; the direction Y may also correspond to a direction substantially parallel to the bristles 17, although it is known that the bristles 17 may have different inclinations with respect to the brush head. The interference height i determines the strength of the snap engagement and ensures that the risk of accidental detachment of the brush head from the handle is reduced during use. In fact, the height i will affect the force needed to assemble and disassemble the head. The snap locking mechanism is designed to be hard to disengage while in use, i.e. while the toothbrush is used to clean the teeth. In fact, the majority of the forces applied to the bristles (while brushing the teeth) works perpendicular to the longitudinal direction X, thus creating a stronger engagement between the protrusion 19 and the element 32 forming the inclined surface 18. The brush head 11 can be detached from the handle 12 manually by the user, pulling the two components 11 and 12 away from each other along the longitudinal direction X. The angle α discussed later with reference to FIG. 10 and the interference i ensures that the force for detaching the brush head from the handle can be comfortably exerted by the user, while at the same time reducing the risk of accidental detachment of the head during use.

Preferably, the recess 14 is open on a back side of the replaceable head 11 opposite to the bristles 17. The recess 14 includes an end facing the handle during the insertion which is open in the longitudinal direction to allow the insertion of the finger along the direction X. At the opposite side, the recess 14 includes an end closed in the longitudinal direction so as to form an arrest surface which the finger 13 abuts in assembled state (see FIG. 7).

Preferably, the non-flexible portion 13b has a T-shaped cross section, e.g. obtained by means of two longitudinal ribs 20. The flexible portion 13a does not have a T-shaped cross section. The flexible portion 13a may have a rectangular cross section, in order to achieve a desired degree of flexibility.

In the illustrated embodiment, the non-flexible portion 13b includes two lateral ribs 20 on opposite sides of the finger 13 configured to slide and engage into corresponding grooves 21 formed in the recess 14 during the elastic flexing of the flexible portion 13a. The ribs 20 are parallel to the longitudinal direction X of the finger 13. Advantageously, the ribs 20 extends along the whole length of the non-flexible portion 13b in the direction X. The ribs 20 contribute to avoid substantial deformations of the non-flexible portion 13b during the detachment and attachment to the brush head. The ribs 20 do not extend to the handle 12 or to flexible portion 13a. Advantageously, the ribs 20 are formed on an upper side of the finger 13 opposite to a lower side of finger forming the back surface of the toothbrush when the brush head 11 is mounted on the handle 12. The ribs 20 may form a planar surface together with the upper side of the finger 13 as shown e.g. at FIG. 3. As well illustrated at FIG. 9, the grooves 21 are preferably formed adjacent to a bottom surface 30 of the recess 14. The ribs 20 have a thickness which is in the range 20%-65% of a thickness c of the non-flexible portion 13b measured in the direction Y substantially parallel to the bristles 17 when the head is mounted on the handle, preferably in the range 30%-40% of the thickness c of the non-flexible portion 13b. In a specific example, the ribs 20 have a thickness of approximately 1 mm; depending on the tufting technologies or used materials, however, the head and the ribs might be thinner. The grooves 21 have a thickness corresponding to the thickness of the ribs 20.

Figure 8:
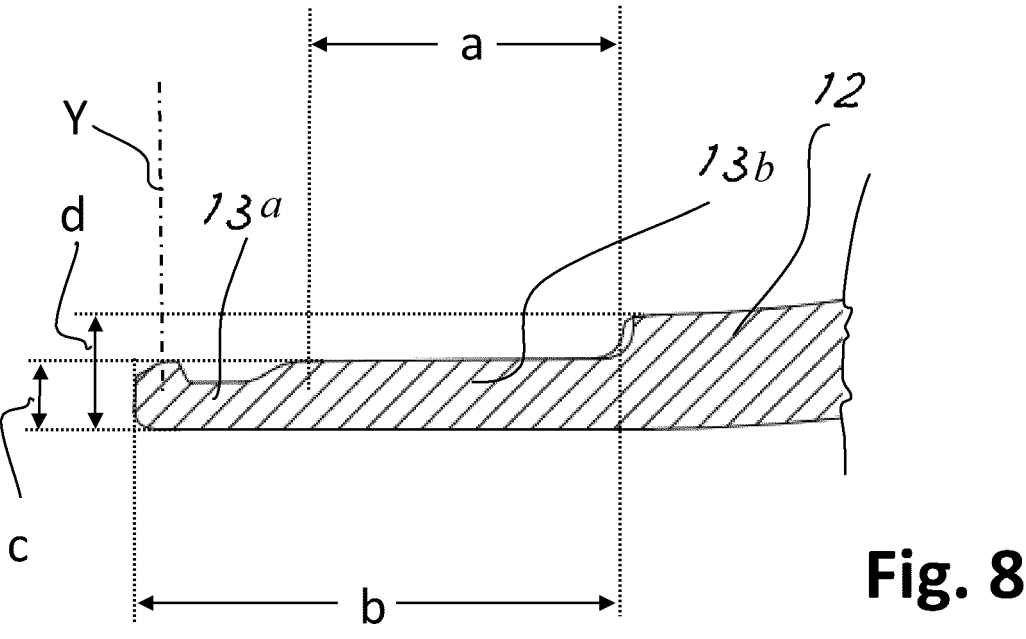
FIGS. 8 and 10 show details of the finger of the handle in cross section.

As shown in FIG. 8, the length a of the non-flexible portion 13b in the longitudinal direction X is in the range 50%-80% of the whole length b of the finger 13 received in the recess 14, preferably in the range 65%-75% of the whole length b of the finger 13 received in the recess 14. In a specific example, the length a is approximately 16 mm, and the length b is approximately 23 mm, although other dimensions may be adopted.

The flexible portion 13a forms a concavity 31 (see FIG. 4) between the non-flexible portion 13b and the protrusion 19 on an upper side of the finger facing the brush head when the brush head 11 is mounted on the handle 12. The part of the flexible portion 13a forming the concavity 31 has a thickness in the range 40%-80% of the thickness c of the non-flexible portion 13b in a direction substantially parallel to the bristles 17, preferably in the range 60%-80% of the thickness c of the non-flexible portion 13b. In a specific example, the thickness of the flexible portion forming the concavity 31 is approximately 2.15 mm, e.g. in the range 2 mm-2.3 mm, although other dimensions may be adopted.

With respect to the direction Y substantially parallel to the bristles 17 when the head is mounted on the handle, the thickness c of the non-flexible portion 13b is in the range 55%-85% of the thickness d of a segment of the handle 12 adjacent to the non-flexible portion 13b, preferably in the range 55%-65% of the thickness d of a segment of the handle 12 adjacent to the non-flexible portion 13b (see FIG. 8). In a specific example, the thickness d is approximately 5 mm, e.g. in the range 4 mm-6 mm, although other dimensions may be adopted.

Figure 9:
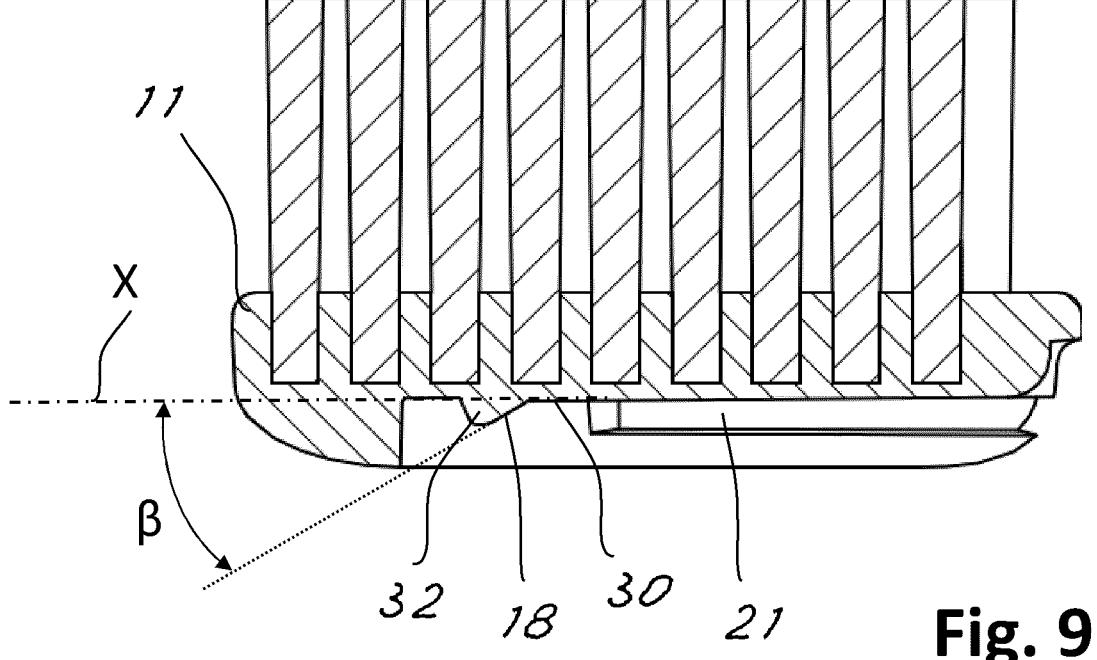
FIG. 9 shows details of the brush head in cross section.

As shown at FIG. 9, when the brush head 11 is mounted on the handle, the surface 18 is inclined with respect to the longitudinal direction X of an angle β in the range 5°-65°, preferably in the range 20°-40°, most preferably in the range 25°-35°. In a specific example, the angle β may be approximately 30°.

Figure 10:
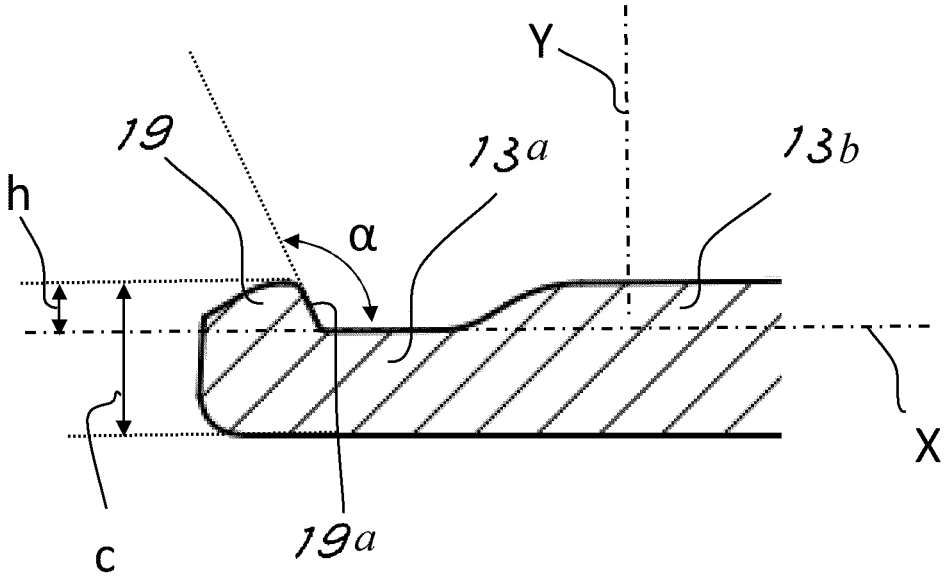

As shown at FIG. 10, the protrusion 19 includes a snap engagement surface 19a facing the non-flexible portion 13b and being inclined of an angle α in the range 100°-135° with respect to the longitudinal direction X, preferably in the range 110°-125°. In a specific example, the angle α is approximately 115°. The snap engagement surface 19a is configured to lock the finger 13 into the recess 14 by cooperating with the element 32 forming the inclined surface 18.

As further shown in FIG. 10, the protrusion 19 has a height h in the range 20%-70% of the thickness c of the non-flexible portion 13b measured in a direction Y from a back side of the brush head to a front side of the brush head carrying the bristles, or the protrusion 19 has a height h in the range 0.5 mm-2.5 mm, preferably in the range 0.75 mm-1.25 mm. In a specific example, the height h is approximately 1 mm and the thickness c is approximately 3 mm, although other dimensions may be adopted.

With reference to FIG. 4-7, the attachment of the head 11 to the handle 12 is further described. FIG. 4 shows the phase in which the handle 12 is approached to the brush head 11 before the engagement. The finger 13 is brought in the vicinity of the recess 14 along the longitudinal direction X. FIG. 5 shows the finger 13 engaged in the recess 14 before the snap engagement; in this phase the ribs 20 of the non-flexible portion 13b engages in a slidable manner in the grooves 21 in the recess 14, but the flexible portion 13a has not yet undergone any flection; in this phase the finger 13 can slide along the longitudinal direction X which corresponds to the direction of insertion of the finger 13 into the recess 14. FIG. 6 shows the phase in which the flexible portion 13a flexes away from the bristles 17 in a direction substantially perpendicular to the longitudinal direction X, as shown by the arrow; the flection is caused by the sliding engagement of the protrusion 19 with the inclined surface 18 in the recess 14, under the force applied by the user in the direction X to attach the head 11 to the handle 12. FIG. 7 shows the head 11 locked to the handle 12, where the protrusion 19 snapped into an engagement position in the recess and locks the head 11 to the handle 12 by cooperating with the element 32 forming the inclined surface 19.

The above description of embodiments applying the innovative principles of the invention is provided solely for the purpose of illustrating said principles and must thus not be considered as limiting the scope of the invention claimed herein.

Figure 11:
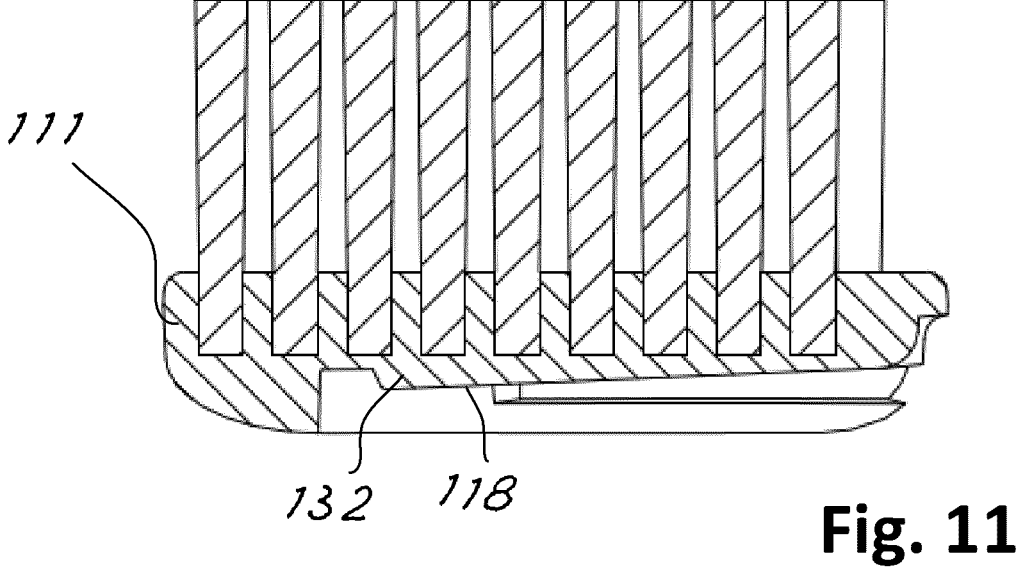
FIG. 11 shows details of a brush head of an alternative embodiment in cross section.

According to the preferred embodiment above described, the flexible finger portion 13a is configured to flex due to the interaction with an inclined surface 18 formed in the recess 14 during insertion of the finger 13 into the recess 14 along the longitudinal direction X (see FIGS. 4-6), wherein the inclined surface 18 is formed by a local detail, i.e. element 32, protruding locally from the bottom surface of the recess 14. However, according to an alternative embodiment of the brush head 111 as illustrated in FIG. 11, the inclined surface 118 causing the flection of the flexible portion of the finger could be formed by the base surface of the recess; in this case, the bottom surface of the recess may be ramped along substantially the whole length of the recess until the end of the element 132 forming the locking detail of the snap locking mechanism. In this embodiment, the non-flexible portion of the finger may advantageously be tapered. In other embodiments, the inclined surface formed in the recess in the brush head may have a limited extension in the longitudinal direction and possibly be formed by a simple edge interacting with the flexible portion of the finger to flex it away from the bristle.

The invention claimed is:

1. A toothbrush including a handle forming a gripping portion of the toothbrush and a replaceable brush head carrying a plurality of bristles,
   wherein the replaceable head is connectable to the handle in a detachable manner by means of a snap locking mechanism,
   the snap locking mechanism including a finger protruding from the handle and a recess formed in the brush head,
   wherein the finger extends along a longitudinal direction (X);
   wherein the finger includes a flexible portion and a non-flexible portion that are integral to each other and that are configured to be at least partly received in the recess when the brush head is mounted on the handle;
   wherein the non-flexible portion connects the flexible portion to the handle;
   wherein the flexible portion is configured to elastically flex away from the bristles with respect to the non-flexible portion in a direction transversal to the longitudinal direction (X) during the insertion of the finger into the recess along the longitudinal direction (X),
   wherein the flexible portion is configured to flex due to the interaction with an inclined surface formed in the recess during insertion of the finger into the recess along the longitudinal direction (X), wherein the flexible portion includes a protrusion configured to snap into an engagement position with the recess when the protrusion slides beyond the inclined surface inside the recess, wherein the recess is open on a back side of the replaceable head opposite to the bristles, wherein the non-flexible portion includes two lateral ribs on opposite sides of the finger configured to slide and engage into corresponding grooves formed in the recess during the elastic flexing of the flexible portion, wherein said lateral ribs do not extend to the flexible portion.

2. The toothbrush according to claim 1, wherein, when the brush head is mounted on the handle, the surface is inclined with respect to the longitudinal direction (X) of an angle (β) in the range 5°-65°.

3. The toothbrush according to claim 2, wherein the angle (B) is in the range of 20°-40°.

4. The toothbrush according to claim 1, wherein, when the protrusion is in the engagement position with the recess, an interference height of the protrusion and an element of the recess forming the inclined surface is in the range 0.5 mm-2.5 mm when measured in a direction (Y) perpendicular to the longitudinal direction (X).

5. The toothbrush according to claim 4, wherein the interference height of the protrusion and the element of the recess forming the inclined surface is in the range of 0.5 mm-1.2 mm.

6. The toothbrush according to claim 1, wherein the protrusion has a height (h) in the range 20%-70% of the thickness (c) of the non-flexible portion measured in a direction (Y) from a back side of the brush head to a front side of the brush head carrying the bristles, or the protrusion has a height (h) in the range 0.5 mm-2.5 mm.

7. The toothbrush according to claim 6, wherein the protrusion has a height (h) in the range 0.75 mm-1.25 mm.

8. The toothbrush according to claim 1, wherein the protrusion includes a snap engagement surface facing the non-flexible portion and being inclined of an angle (α) in the range 100°-135° with respect to the longitudinal direction (X), the snap engagement surface being configured to lock the finger into the recess.

9. The toothbrush according to claim 8, wherein the angle (a) is in the range 110°-125°.

10. The toothbrush according to claim 1, wherein the non-flexible portion has a T-shaped cross section.

11. The toothbrush according to claim 1, wherein the length (a) of the non-flexible portion in the longitudinal direction (X) is in the range 50%-80% of the whole length (b) of the finger received in the recess.

12. The toothbrush according to claim 11, wherein the wherein the length (a) is in the range 65%-75% of the whole length (b) of the finger received in the recess.

13. The toothbrush according to claim 1, wherein, with respect to a direction (Y) substantially parallel to the bristles when the brush head is mounted on the handle, the thickness (c) of the non-flexible portion is in the range 55%-85% of the thickness (d) of a segment of the handle adjacent to the non-flexible portion.

14. The toothbrush according to claim 13, wherein the thickness (c) of the non-flexible portion is in the range 55%-65% of the thickness (d) of a segment of the handle adjacent to the non-flexible portion.

15. The toothbrush according to claim 1, wherein the grooves are formed adjacent to a bottom surface of the recess.

16. The toothbrush according to claim 1, wherein the ribs are formed on an upper side of the finger opposite to a lower side of finger forming the back surface of the toothbrush when the brush head is mounted on the handle, wherein the ribs form a planar surface together with the upper side of the finger.

17. The toothbrush according to claim 1, wherein the ribs have a thickness which is in the range 20%-65% of a thickness (c) of the non-flexible portion measured in a direction (Y) substantially parallel to the bristles when the head is mounted on the handle.

18. The toothbrush according to claim 17, wherein the ribs have a thickness which is in the range 30%-40% of the thickness (c) of the non-flexible portion.

19. The toothbrush according to claim 1, wherein the flexible portion forms a concavity between the non-flexible portion and the protrusion on an upper side of the finger facing the brush head when the brush head is mounted on the handle, wherein the part of the flexible portion forming the concavity has a thickness in the range 40%-80% of the thickness (c) of the non-flexible portion in a direction substantially parallel to the bristles.

20. The toothbrush according to claim 1, wherein the longitudinal direction (X) of the finger is substantially parallel to a longitudinal direction of a gripping portion of the handle.

*  *  *  *  *